United States Patent
Ren et al.

(10) Patent No.: US 8,427,997 B2
(45) Date of Patent: Apr. 23, 2013

(54) ACCESS METHOD AND APPARATUS OF MULTIMEDIA BROADCAST MULTICAST SERVICE ON DEDICATED CARRIER

(75) Inventors: Shiyan Ren, Beijing (CN); Yu Ding, Beijing (CN); Lei Mao, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 297 days.

(21) Appl. No.: 12/679,367

(22) PCT Filed: Sep. 18, 2008

(86) PCT No.: PCT/CN2008/001621
§ 371 (c)(1),
(2), (4) Date: Jun. 22, 2010

(87) PCT Pub. No.: WO2009/049472
PCT Pub. Date: Apr. 23, 2009

(65) Prior Publication Data
US 2010/0278090 A1    Nov. 4, 2010

(30) Foreign Application Priority Data
Sep. 21, 2007  (CN) .......................... 2007 1 0122182

(51) Int. Cl.
*H04H 20/71* (2008.01)
(52) U.S. Cl.
USPC ........................... 370/312; 370/389; 370/390
(58) Field of Classification Search .......... 370/310–350; 455/422.1–462
See application file for complete search history.

(56) References Cited

U.S. PATENT DOCUMENTS

2005/0007971 A1* 1/2005 Jeong et al. .................. 370/312
2006/0018279 A1* 1/2006 Agrawal et al. .............. 370/330

* cited by examiner

*Primary Examiner* — Charles C Jiang
(74) *Attorney, Agent, or Firm* — Nixon Peabody LLP (57) ABSTRACT

An access method of MBMS on dedicated carrier relates to MBMS access technology on dedicated carrier, including: synchronize a user equipment to a MBMS dedicated carrier; the user equipment detects a start-frame of system message on the MBMS dedicated carrier; and the terminal monitors the system message from the start-frame of system message. An apparatus of realizing the method is also provided.

7 Claims, 6 Drawing Sheets

ACCESS METHOD AND APPARATUS OF MULTIMEDIA BROADCAST MULTICAST SERVICE ON DEDICATED CARRIER

FIELD OF THE INVENTION

The present invention relates to an access technology of a MBMS (Multimedia Broadcast Multicast Service) dedicated carrier, and more specifically, to an access method and apparatus of MBMS on dedicated carrier in a TD-SCDMA (Time Division-Synchronous Code Division Multiple Access) system.

BACKGROUND OF THE INVENTION

To effectively use mobile communication network resources, the third Generation mobile communication global standardization organization (3GPP) Release 6 puts forward the MBMS of mobile communication networks, and thus in the mobile communication networks a point-to-multipoint service is provided in which one data source sends data to multiple users, thereby realizing network resources share, and improving the utilization ratio of the network resources, especially the sharing of air interface resources.

The MBMS put forward by the 3GPP can realize not only multicast and broadcast of plain text low rate messages, but also multicast and broadcast of high rate multimedia services, which doubtlessly complies with the trend in future mobile data development. To further improve the transmission rate of MBMS data, for the FDD (Frequency Division Duplex) and the 3.84 Mcps TDD (Time Division Duplex), the 3GPP is currently putting forward a solution of using a dedicated independent carrier to bear the MBMS, that is, in the coverage area of a current universal mobile communication system a frequency layer dedicated for transmitting the MBMS is additionally established, and user equipments are capable of receiving an ordinary carrier and a dedicated carrier to transmit the MBMS.

Figure 1:
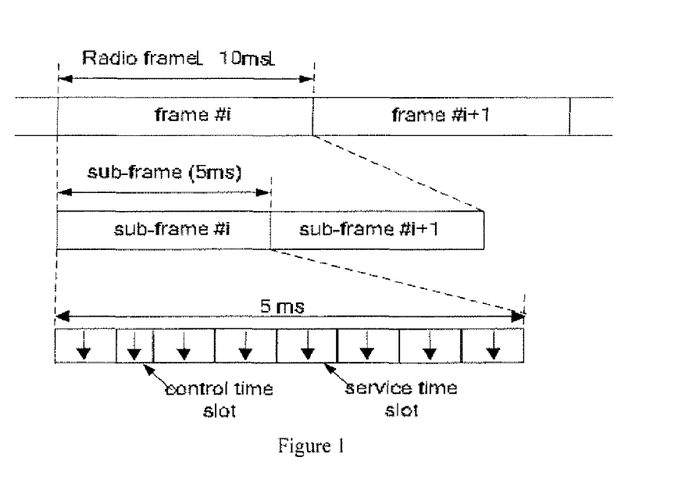
FIG. 1 is schematic view of the structure of a MBMS dedicated carrier frame in a TDD system.

In the 3GPP Release 7, the IPWireless puts forward a new frame structure (a burst type) for the 3.84 Mcps TDD to support a MBMS dedicated carrier system. To meet operators' requirements on coverage and transmission rate, the current frame structure is optimized. FIG. 1 is a schematic view of the frame structure of a MBMS dedicated carrier in a TDD system, and as shown in FIG. 1, the MBMS dedicated carrier wireless frame is 10 ms, and each frame includes two sub-frames with the same structure being 5 ms respectively. The sub-frame includes 7 service time slots and one control time slot, the service time slots are TS0 to TS6 from the left to the right sequentially, and the control time slot is located between TS0 and TS1. To meet requirements on the transmission of data services, the time slots in the sub-frame are all downlink time slots.

Figure 2:
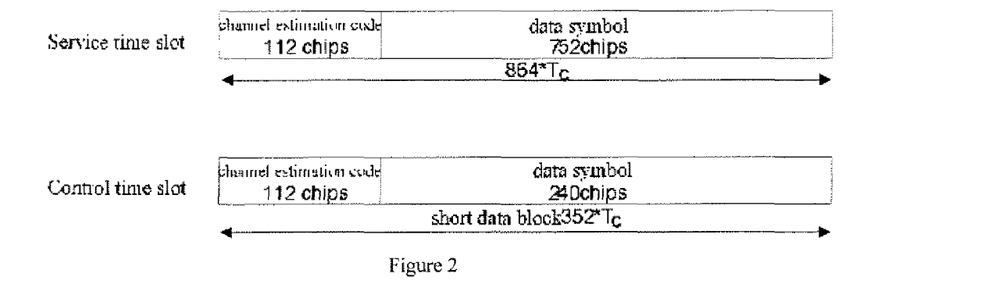
FIG. 2 is a schematic view of the structure of the time slot in the frame structure in FIG. 1.

FIG. 2 is a schematic view of the time slot structure in the frame structure in FIG. 1, and as shown in FIG. 2, despite the service time slot or the control time slot, the head of the time slot is a 112-chip preamble consisting of a 64-chip channel estimation code and a 48-chip cyclic protection interval. The cyclic protection may also contain 32 chips, the preamble may also contain 96 chips, and the structure of the preamble is not separately illustrated with a figure herein.

Currently, new MBMS dedicated carrier systems overlap the coverage of current TD-SCDMA systems, and there exists frequency isolation between them, no interference will occur between them, and handset user equipments can not only receive broadcast television programs, but also achieve ordinary voice services. However, mobile television terminals can only receive broadcast television programs. It is very important for handset user equipments and mobile television terminals accessing and synchronizing to the MBMS dedicated carrier system, which is a precondition for users to enjoy MBMS services, and currently there is no any related solution.

SUMMARY OF THE INVENTION

In view of this, the present invention mainly aims to provide an access method and apparatus of MBMS on dedicated carrier, which is capable of simplifying the access of a user equipment to the MBMS dedicated carrier and improving access quality.

To achieve the above objects, the technical solution of the present invention is realized as follows.

The present invention provides an access method of MBMS on dedicated carrier, including:

synchronize a user equipment to a MBMS dedicated carrier;

the user equipment determines the start-frame of the system message on the MBMS dedicated carrier; and the terminal monitors a system message from the start-frame of the system message.

According to the embodiment of the present invention, that the user equipment determines the start-frame of the system message includes:

A. continuously detect the preamble of the control time slot of a sub-frame, determine a phase difference between the preambles of the control time slot and the service time slot of each sub-frame, and sequentially calculate difference values between the phase differences of the preambles of the control time slots and the service time slots of every two continuous sub-frames; and B. determine an start-frame for transmitting a system message according to the difference values between the phase differences of the preambles determined in step A.

According to the embodiment of the present invention, subsequent to step A includes:

if the difference values between the phase differences of the preambles of the control time slots and the service time slots of every two continuous sub-frames are not equal to each other, judge whether the difference between the difference values is within a set range, and return to step A if it is not within the set range, and determine the start-frame for transmitting a system message according to the difference values if it is within the set range.

According to the embodiment of the present invention, the service time slot in step A is time slot TS1.

According to the embodiment of the present invention, determining the start-frame of the system message includes:

continuously detect the preamble of the control time slot in the sub-frame, find out the sub-frame in which the codeword of the preamble of the control time slot changes, and determine the start-frame for transmitting the system message according to the agreed number of the sub-frames in which the codeword changes.

According to the embodiment of the present invention, synchronizing a user equipment to a MBMS dedicated carrier includes:

preliminarily synchronize a user equipment to a MBMS dedicated carrier according to the synchronization information of a current ordinary service carrier and the acquired MBMS dedicated carrier information; and taking the control time slot of a currently determined sub-frame and a region of at least 10 chips on both sides of the same as a time window, correlate the determined time window with a pilot signal, then determining the position of the control time slot according to the peak after the correlation and realize frame synchronization of the MBMS dedicated carrier.

According to the embodiment of the present invention, the MBMS dedicated carrier information includes: a MBMS dedicated carrier frequency and the preamble of the control time slot in a MBMS dedicated carrier frame, and the pilot signal is the preamble of the control time slot in the MBMS dedicated carrier frame; and preliminarily synchronizing a user equipment to a MBMS dedicated carrier includes: preliminarily synchronize a user equipment to a MBMS dedicated carrier according to the synchronization information of a current ordinary service carrier and the frequency information of the MBMS dedicated carrier.

According to the embodiment of the present invention, synchronizing a user equipment to a MBMS dedicated carrier includes:

monitor the MBMS dedicated carrier according to the MBMS dedicated carrier frequency carried by the user equipment itself; and select a time window with a length of the sum of half of the preamble length and a sub-frame length on the MBMS dedicated carrier, correlate the selected time window with the preamble of the service time slot of the MBMS dedicated carrier carried by the user equipment, then determine the position of the control time slot and realize frame synchronization of the MBMS dedicated carrier.

The present invention also provides an access apparatus of a MBMS dedicated carrier, including:

a MBMS dedicated carrier synchronizing unit for synchronization to a MBMS dedicated carrier;

a system message start-frame determining unit for determining the start-frame of the system message; and an access monitoring unit for monitoring the system message from the start-frame of the system message.

According to the embodiment of the present invention, the system message start-frame determining unit includes:

a continuous frame control time slot preamble phase difference determining module for continuously detecting the preambles of the control time slot and the service time slot in each of continuous sub-frames, determining a phase difference between the preambles of the control time slot and the service time slot of each sub-frame, and sequentially calculating difference values between every two continuous preamble phase differences; and a system message start-frame determining module for determining an start-frame for transmitting a system message according to the difference values between the preamble phase differences determined by the continuous frame control time slot preamble phase difference determining module.

According to the embodiment of the present invention, the system message start-frame determining unit further includes:

a difference value judging module which judges, if there are more than two difference values of the determined phase differences, whether the difference between the difference values of the phase differences is within set range, and triggers, if it is not within the set range, the continuous frame control time slot preamble phase difference determining module to re-determine the difference values of the phase differences of continuous sub-frames.

According to the embodiment of the present invention, the continuous frame control time slot preamble phase difference determining module determines a phase difference between the preambles of the control time slot and the service time slot of each sub-frame by specifically:

determine the phase difference between the preambles of the control time slot and time slot TS1 in each sub-frame.

According to the embodiment of the present invention, the system message start-frame determining unit includes:

a codeword changed sub-frame searching module for continuously detecting the preamble of the control time slot in the sub-frame, and finding out the sub-frame in which the codeword of the preamble of the control time slot changes; and a system message start-frame determining module for determining the start-frame for transmitting the system message according to the agreed number of the sub-frames in which the codeword changes.

According to the embodiment of the present invention, the MBMS dedicated carrier synchronizing unit includes:

a preliminary synchronizing module for preliminarily synchronizing a user equipment to a MBMS dedicated carrier according to the synchronization information of a current ordinary service carrier and the acquired MBMS dedicated carrier information; and a MBMS dedicated carrier frame synchronizing module for taking the control time slot of a currently determined sub-frame and a region of at least 10 chips on both sides of the same as a time window, correlating the determined time window with a pilot signal, then determining the position of the control time slot according to the peak after the correlation and realizing frame synchronization of the MBMS dedicated carrier.

According to the embodiment of the present invention, the MBMS dedicated carrier information includes: a MBMS dedicated carrier frequency and the preamble of the control time slot in a MBMS dedicated carrier frame, and the pilot signal is the preamble of the control time slot in the MBMS dedicated carrier frame; and the preliminary synchronizing module preliminarily synchronizes a user equipment to a MBMS dedicated carrier according to the synchronization information of a current ordinary service carrier and the frequency information of the MBMS dedicated carrier.

According to the embodiment of the present invention, the MBMS dedicated carrier synchronizing unit includes:

a MBMS dedicated carrier monitoring module for monitoring the MBMS dedicated carrier according to the MBMS dedicated carrier frequency carried by the user equipment itself; and a MBMS dedicated carrier frame synchronizing module for selecting a time window with a length of the sum of half of the preamble length and a sub-frame length on the MBMS dedicated carrier, correlating the selected time window with the preamble of the service time slot of the MBMS dedicated carrier carried by the user equipment, then determining the position of the control time slot and realizing frame synchronization of the MBMS dedicated carrier.

According to the embodiment of the present invention, the MBMS dedicated carrier synchronizing unit includes:

a preliminary synchronizing unit for preliminarily synchronizing a user equipment to a MBMS dedicated carrier according to the synchronization information of a current ordinary service carrier and the acquired MBMS dedicated carrier information; and a MBMS dedicated carrier frame synchronizing unit for taking the control time slot of a currently determined sub-frame and a region of at least 10 chips on both sides of the same as a time window, correlating the determined time window with a pilot signal, then determining the position of the control time slot according to the peak after the correlation and realizing frame synchronization of the MBMS dedicated carrier.

According to the embodiment of the present invention, the MBMS dedicated carrier information includes: a MBMS dedicated carrier frequency and the preamble of the control time slot in a MBMS dedicated carrier frame, and the pilot signal is the preamble of the control time slot in the MBMS dedicated carrier frame; and the preliminary synchronizing unit preliminarily synchronizes a user equipment to a MBMS dedicated carrier according to the synchronization information of a current ordinary service carrier and the frequency information of the MBMS dedicated carrier.

According to the embodiment of the present invention, the MBMS dedicated carrier synchronizing unit includes:

a MBMS dedicated carrier monitoring unit for monitoring the MBMS dedicated carrier according to the MBMS dedicated carrier frequency carried by the user equipment itself; and a MBMS dedicated carrier frame synchronizing unit for selecting a time window with a length of the sum of half of the preamble length and a sub-frame length on the MBMS dedicated carrier, correlating the selected time window with the preamble of the service time slot of the MBMS dedicated carrier carried by the user equipment, then determining the position of the control time slot and realizing frame synchronization of the MBMS dedicated carrier.

For different user equipments, the present invention adopts different MBMS dedicated carrier access and synchronization manners, and a handset user equipment supports both a traffic service and the MBMS, and generally speaking, a handset user equipment always stays at a traffic carrier, and a user starts to monitor a MBMS dedicated carrier after selecting the MBMS. The present invention fully utilizes this feature of the handset user equipment and uses an ordinary traffic carrier to transmit MBMS dedicated carrier related information, and the handset user equipment is synchronized and accessed to the MBMS dedicated carrier according to the received MBMS dedicated carrier information, thereby realizing the MBMS. For a mobile television terminal, it only supports the MBMS, in the present invention some basic parameter information of synchronizing and accessing the MBMS dedicated carrier system is stored in the mobile television terminal, and the mobile television terminal is synchronized and accessed to the MBMS dedicated carrier according to such basic parameter information, thereby realizing the M. The synchronization and access manners of the present invention are reliable and have low complexity.

DETAILED DESCRIPTION OF THE EMBODIMENT OF THE INVENTION

The core thought of the present invention lies in that the 3GPP Release 7 determines the carrier for MBMS transmission and the corresponding frame structure, but does not relate to synchronizing and accessing a user equipment to a MBMS dedicated carrier. For different user equipments, the present invention uses different MBMS dedicated carrier access and synchronization manners. For a handset user equipment, an ordinary traffic carrier is used to transmit MBMS dedicated carrier related information, and the handset user equipment is synchronized and accessed to the MBMS dedicated carrier according to the received MBMS dedicated carrier information, thereby realizing the MBMS. For a mobile television terminal, in the present invention some basic parameter information of synchronizing and accessing the MBMS dedicated carrier system is stored in the mobile television terminal in advance, and the mobile television terminal is synchronized and accessed to the MBMS dedicated carrier according to such basic parameter information, thereby realizing the MBMS. The synchronization and access manners of the present invention are reliable and have low complexity. The technical solution of the present invention will be detailed hereinafter in conjunction with the accompanying drawings.

Figure 3:
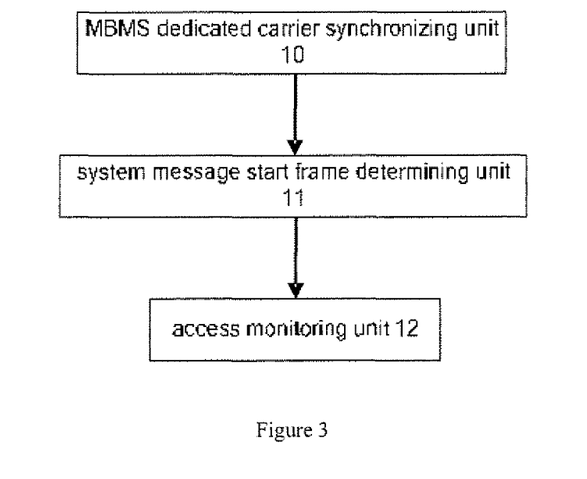
FIG. 3 is a schematic view of the structure of the MBMS dedicated carrier access apparatus according to the present invention.

FIG. 3 is a schematic view of the structure of the MBMS dedicated carrier access apparatus according to the present invention, and as shown in FIG. 3, the MBMS dedicated carrier access apparatus according to the present invention includes a MBMS dedicated carrier synchronizing unit 10, a system message start-frame determining unit 11 and an access monitoring unit 12, wherein the MBMS dedicated carrier synchronizing unit 10 is used for synchronization to a MBMS dedicated carrier. Before realizing the MBMS, a user equipment needs to be synchronized to the MBMS dedicated carrier to monitor the system message of the MBMS dedicated carrier and then to select services of the user's interest.

The system message start-frame determining unit 11 is used to determine the start-frame of the system message. After synchronizing the user equipment to the MBMS dedicated carrier, it starts to monitor the system message borne at the MBMS dedicated carrier, and one complete system message needs to be transmitted by multiple sub-frames and is transmitted in a continuously cyclic manner, and thus an start-frame for transmitting the system message needs to be determined to receive a complete system message.

Access monitoring unit 12 is used to monitor the system message from the start-frame of the system message. And MBMS access of the user equipment is completed according to the received system message.

Figure 4:
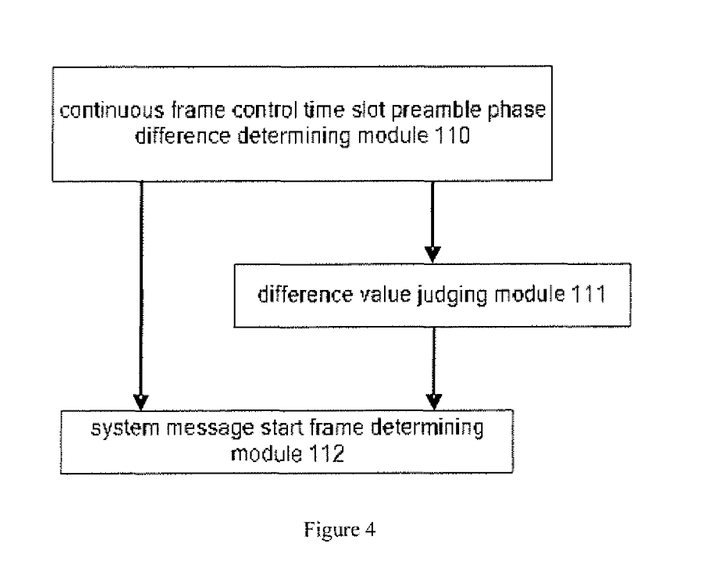
FIG. 4 is a schematic view of the structure of the system message start-frame determining unit shown in structure in FIG. 3.

FIG. 4 is a schematic view of the structure of the system message start-frame determining unit 11 shown in structure in FIG. 3, and as shown in FIG. 4, the system message start-frame determining unit 11 according to the present invention includes a continuous frame control time slot preamble phase difference determining module 110, a difference value judging module 111 and a system message start-frame determining module 112, wherein continuous frame control time slot preamble phase difference determining module 110 is used to detect the preamble of the control time slot and the service time slot in each of continuous sub-frames, determine a phase difference between the preambles of the control time slot and the service time slot of each sub-frame, and sequentially calculate a difference value between every two continuous preamble phase differences.

In a MBMS dedicated carrier frame, the control time slot is used to transmit a control instruction and the system message, while the system message needs to be transmitted cyclically, and generally speaking, multiple sub-frames are needed for completely transmitting the system message, and to identify the start-frame of the system message conveniently, in the last several frames of the cyclic transmission frames of a system message, the preamble of a control time slot has a constant phase offset to differentiate the start position of cyclically transmitting the system message. The preamble in a service time slot is generally a 0 phase code without any phase change; in the cyclic frames of the system message, except the phase change of the control time slots in the last several frames, the phases of the preambles of the remaining control time slots are also generally 0, and by making comparison of the phases of the preambles in the control time slot and the service time slot, the frame in which the phase of the preamble of the control time slot changes can be determined, thereby determining the start-frame of the system message. If it is not a system message end frame, the phase difference between the preambles of the control time slot and the service time slot is always 0, and when it is not 0, it shows that the current frames are the last several frames of the system message, and by determining the phase differences between the preambles of the control time slots and the service time slots of at least two continuous sub-frames, the phase offset of the preamble of the control time slots of the last several frames can be calculated, thereby determining the number of the last several frames of the system message. For example, when it is determined that the phase offset of the preambles of the control time slots of the last several frames is 72°, the number of the system message end frame is marked as 4 frames. After determining a first phase changed sub-frame, the fifth sub-frame is the start-frame of the system message. To ensure the accuracy of the determined phase difference between the preambles of the control time slot, the present invention selects and phase-compares the preambles of the control time slot and time slot TS1, because at a MBMS dedicated carrier sub-frame, the distance between the preamble of the control time slot and the preamble of the service time slot is the closest, that is, the interval of one control time slot, 352 chips. This helps much to make calculation for high speed mobile user equipments. Of course, the above object can also be achieved by selecting and phase-comparing the preambles of the control time slot and time slot TS0 or other service time slots being farther thereto. The phase difference determined by a time slot far away will be very inaccurate, which does not help to a user equipment which is moving. Please note that the present invention does not directly calculate the phase difference between the preambles of the control time slots of two continuous sub-frames, which is due to that phase offset of the channels in different sub-frames are inconsistent with each other, and the offset is large, and the resulting error is also large.

A system message start-frame determining unit 11 shown in FIG. 4 is only applied in a scene of determining the system message end frame by phase change.

The system message start-frame determining module 112 is used to determine a start-frame for transmitting a system message according to the difference values between the preamble phase differences determined by the continuous frame control time slot preamble phase difference determining module. For example, when it is determined that the preamble phase offset of the control time slots of the last several frames is 72°, the number of frames marking the system message end is 4 frames. After determining a first phase changed sub-frame, the fifth sub-frame is the start-frame of the system message.

Difference value judging module 111 judges, if there are more than two difference values of the determined phase differences, whether the difference between the difference values of the phase differences is within a set range, and triggers, if it is not within the set range, the continuous frame control time slot preamble phase difference determining module 110 to re-determine the difference values of the phase differences of continuous sub-frames. Difference value judging module 111 is further to ensure the calculation result of the preamble phase difference between the control time slot and the service time slot, that is, the preamble phase differences between the control time slot and the service time slot in more continuous sub-frames can be calculated, compare the differences of the difference values between the phase differences, and if the differences are very small and within a set threshold range, it is deemed that the determined difference value between the phase differences is accurate and the determined difference value between the phase differences can be used for determination of the total number of the frames of the system message, and if the difference is very large and is not within the set threshold range, trigger the control time slot and service time slot preamble phase difference determining module 110 to re-determine the phase differences of continuous sub-frames. Difference value judging module 111 can avoid the inaccuracy of the difference value between the phase differences due to the loss of the end frames of the system message.

Figure 5:
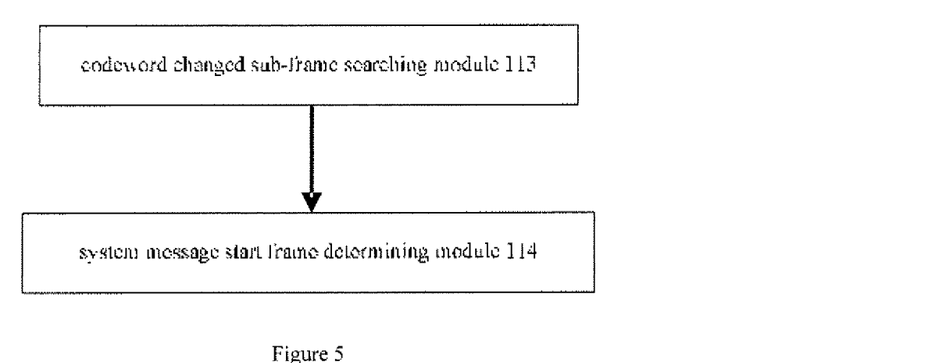
FIG. 5 is a schematic view of another structure of the system message start-frame determining unit shown in structure in FIG. 3.

FIG. 5 is a schematic view of another structure of the system message start-frame determining unit 11 shown in structure in FIG. 3, and as shown in FIG. 5, the another structure of the system message start-frame determining unit 11 according to the present invention includes a codeword changed sub-frame searching module 113 and a system message start-frame determining module 114, wherein the codeword changed sub-frame searching module 113 is used to continuously detect the preamble of the control time slot in the sub-frame, and find out the sub-frame in which the codeword of the preamble of the control time slot changes. The system message start-frame determining unit shown in FIG. 5 is realized in a manner that codeword changes in a system message end frame. For the control time slot preamble in an ordinary frame, use an agreed codeword, for example, 0000, and for the system message end frame, use a codeword different from the ordinary frame, for example, 0001, and the system message end frame is identified by detecting the codeword change. The system message start-frame determining module 114 is used to determine the start-frame for transmitting the system message according to the agreed number of the sub-frames in which the codeword changes. The system message start-frame determining module 114 can determine the start-frame of the system message according to the detected system message end frame and then the agreed number of the end frames. For example, if it is detected that the codeword in the current frame changes while the agreed number of the system message end frames is 4, the fifth frame from the current frame is the start-frame of the system message.

Figure 6:
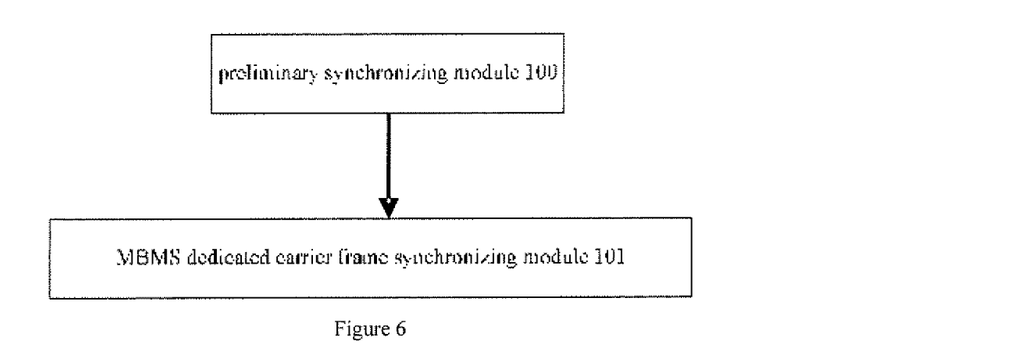
FIG. 6 is a schematic view of the structure of the MBMS dedicated carrier synchronizing unit shown in the structure in FIG. 3.

FIG. 6 is a schematic view of the structure of MBMS dedicated carrier synchronizing unit 10 shown in the structure in FIG. 3, and as shown in FIG. 6, MBMS dedicated carrier synchronizing unit 10 according to the present invention includes a preliminary synchronizing module 100 and a MBMS dedicated carrier frame synchronizing module 101, wherein, the preliminary synchronizing module 100 is used to preliminarily synchronize a user equipment to a MBMS dedicated carrier according to the synchronization information of a current ordinary service carrier and the acquired MBMS dedicated carrier information. Wherein, the MBMS dedicated carrier information includes, but not limited to, a MBMS dedicated carrier frequency and the preamble of the control time slot in a MBMS dedicated carrier frame. The preliminary synchronizing module 100 preliminarily synchronizes a user equipment to a MBMS dedicated carrier according to the synchronization information of the current ordinary service carrier and the frequency information of the MBMS dedicated carrier. MBMS dedicated carrier synchronizing unit 10 shown in FIG. 6 is designed for a handset user equipment. The handset user equipment is first to monitor an ordinary carrier, while the ordinary carrier and the MBMS dedicated carrier adopt a unified GPS timing apparatus, to ensure complete synchronization of the frame initiation times of two systems. After power on, the handset user equipment first searches an ordinary cell for staying, then acquires a time synchronizing signal from the ordinary cell, and can obtain some information of a MBMS dedicated carrier in a current coverage area from the system information of the ordinary cell, for example, a dedicated carrier frequency, to be synchronized to a dedicated carrier system when necessary. As the ordinary carrier and the MBMS dedicated carrier systems have different cell radiuses, the maximum difference between the distances of the handset user equipment to different base stations is nearly 2000 m, there will be an offset within a certain range when the user directly uses the time information of the ordinary carrier to be synchronized to the dedicated carrier, and the offset is within 10 chips, and thus the synchronization realized by the preliminary synchronizing module 100 is just a preliminary synchronization.

MBMS dedicated carrier frame synchronizing module 101, taking the control time slot of a currently determined sub-frame and a region of at least 10 chips on both sides of the same as a time window, correlates the determined time window with a pilot signal, then determines the position of the control time slot according to the peak after the correlation and realizes frame synchronization of the MBMS dedicated carrier. After the preliminary synchronization, the inter-frame offset is about within 10 chips, and to achieve precise synchronization, the accurate position of the control time slot in the frame needs to be determined. Wherein the pilot signal is the preamble of the control time slot in a MBMS dedicated carrier frame. The MBMS dedicated carrier frame synchronizing module 101 first selects a time window, and the time window that takes the control time slot as a center, and has a length of at least 10 chips on both sides of the same is selected to ensure that the selected time window includes a complete preamble of one control time slot. Then, correlate the selected time window with the preamble in the control time slot, that is, obtain a product of the preamble of the control time slot with the time window symbol. After correlation, at the preamble of the control time slot is a peak, and after determining the accurate position of the preamble of the control time slot, frame synchronization is completed, that is, differentiation of the system message can be performed. One skilled in the art should understand that determination of the precise position of the control time slot can be realized easily by the correlation.

The information of the preamble of the control time slot for correlation can be borne on the system message of an ordinary service carrier to be transmitted to the handset user equipment, and can also be stored in the handset user equipment in advance.

Figure 7:
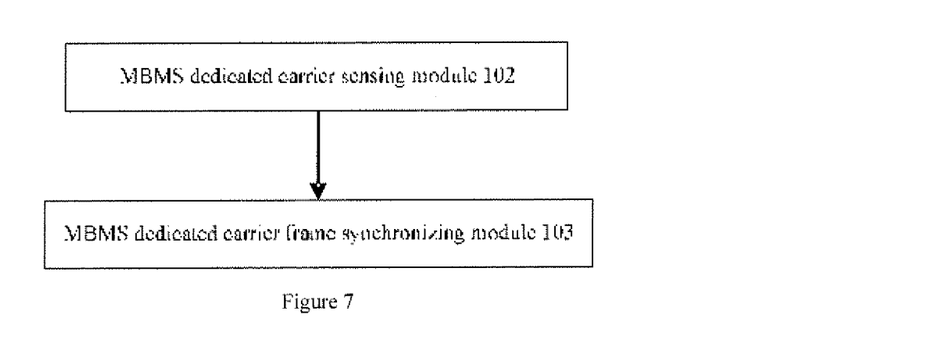
FIG. 7 is a schematic view of another structure of the MBMS dedicated carrier synchronizing unit shown in the structure in FIG. 3.

FIG. 7 is a schematic view of another structure of the MBMS dedicated carrier synchronizing unit shown in the structure in FIG. 3, and as shown in FIG. 7, the another structure of MBMS dedicated carrier synchronizing unit 10 according to the present invention includes a MBMS dedicated carrier monitoring module 102 and a MBMS dedicated carrier frame synchronizing module 103, wherein, the MBMS dedicated carrier monitoring module 102 is used to monitor the MBMS dedicated carrier according to the MBMS dedicated carrier frequency carried by the user equipment itself.

The MBMS dedicated carrier frame synchronizing module 103 is used to select a time window with a length of the sum of half of the preamble length and a sub-frame length on the MBMS dedicated carrier, correlates the selected time window with the preamble of the service time slot of the MBMS dedicated carrier carried by the user equipment, then determines the position of the control time slot and realizes frame synchronization of the MBMS dedicated carrier. The time window selected by the MBMS dedicated carrier frame synchronizing module 103 at least is of the sum of 5 ms and half of the preamble of the control time slot, that is, a complete preamble of the control time slot needs to be selected, and in this way, the positions of the preambles of respective control time slots can be determined conveniently when the preamble of the control time slot is correlated with the selected time window, thereby making synchronization of the user equipment to the MBMS dedicated carrier convenient.

The MBMS dedicated carrier synchronizing unit 10 shown in FIG. 7 is designed for a mobile television terminal.

Figure 8:
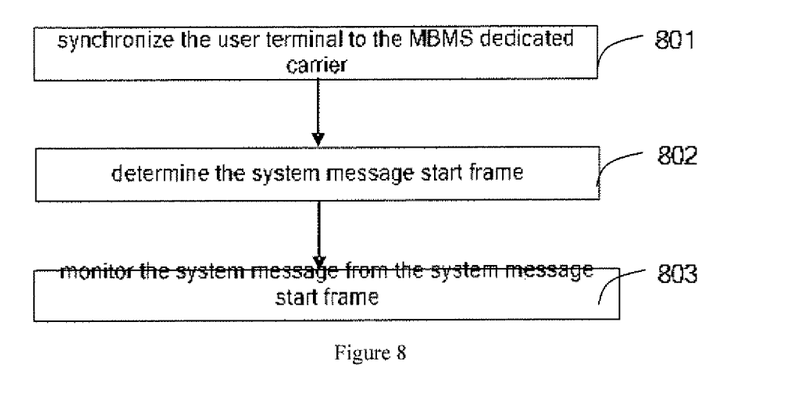
FIG. 8 is a flowchart of the access method of MBMS on dedicated carrier according to the present invention.

FIG. 8 is a flowchart of the access method of MBMS on dedicated carrier according to the present invention, and as shown in FIG. 8, the access method of MBMS on dedicated carrier according to the present invention includes the following steps:

Step 801, synchronizing the user equipment to the MBMS dedicated carrier. Please refer to the description of the MBMS dedicated carrier synchronizing unit 10 in FIG. 4 and FIG. 5 for the manner for synchronization to the MBMS dedicated carrier.

Step 802, determining the start-frame of the system message. Please refer to the description of the system message start-frame determining unit 11 in FIG. 4 and FIG. 5 for the specific manner for determining the start-frame of the system message.

As an embodiment of the present invention, the user equipment determines the start-frame of the system message in the following manner:

A. continuously detect the preamble of the control time slot of a sub-frame, determining the phase difference between the preambles of the control time slot and the service time slot of each sub-frame, and sequentially calculate difference values between the phase differences of the preambles of the control time slots and the service time slots of every two continuous sub-frames; and B. determine an start-frame for transmitting a system message according to the difference values between the phase differences of the preambles determined in step A.

In addition, subsequent to step A:

if the difference values between the phase differences of the preambles of the control time slots and the service time slots of every two continuous sub-frames are not equal to each other, judge whether the difference between the difference values is within a set range, and return to step A if it is not within the set range, and determine the start-frame for transmitting a system message according to the difference values if it is within the set range.

Preferably, the service time slot in step A is time slot TS1.

As another embodiment of the present invention, the user equipment determines the start-frame of the system message in following manner, including:

continuously detect the preamble of the control time slot in the sub-frame, find out the sub-frame in which the codeword of the preamble of the control time slot changes, and determine the start-frame for transmitting the system message according to the agreed number of the sub-frames in which the codeword changes.

Step 803, monitor the system message from the start-frame of the system message. Determine and then monitor the start-frame of the system message, to obtain a complete system message, and access the same when there is a service of the user's interest.

Figure 9:
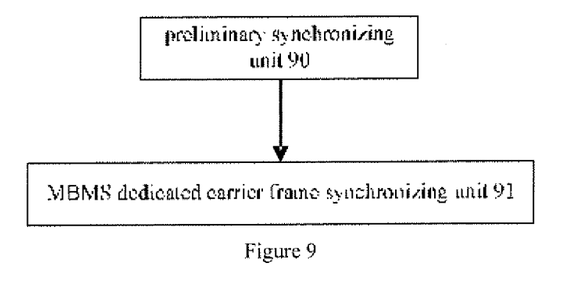
FIG. 9 is a schematic view of the structure of the MBMS dedicated carrier synchronizing apparatus according to the present invention.

FIG. 9 is a schematic view of the structure of the MBMS dedicated carrier synchronizing apparatus according to the present invention, and as shown in FIG. 9, the MBMS dedicated carrier synchronizing apparatus according to the present invention includes a preliminary synchronizing unit 90 and a MBMS dedicated carrier frame synchronizing unit 91, wherein, the preliminary synchronizing unit 90 is used to preliminarily synchronize a user equipment to a MBMS dedicated carrier according to the synchronization information of a current ordinary service carrier and the acquired MBMS dedicated carrier information.

The MBMS dedicated carrier frame synchronizing unit 91, taking the control time slot of a currently determined sub-frame and a region of at least 10 chips on both sides of the same as a time window, is used to correlate the determined time window with a pilot signal, then determine the position of the control time slot according to the peak after the correlation and realize frame synchronization of the MBMS dedicated carrier.

The MBMS dedicated carrier synchronizing apparatus shown in FIG. 9 has the same structure with the MBMS dedicated carrier synchronizing unit 10 shown in FIG. 6, and then is omitted here.

Figure 10:
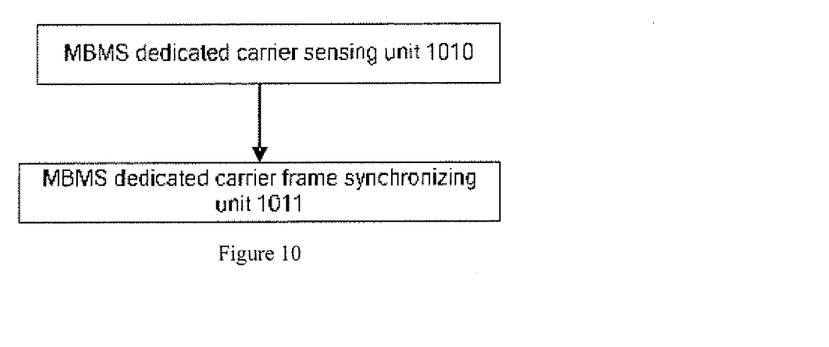
FIG. 10 is a schematic view of another structure of the MBMS dedicated carrier synchronizing apparatus according to the present invention.

FIG. 10 is a schematic view of another structure of the MBMS dedicated carrier synchronizing apparatus according to the present invention, and as shown in FIG. 10, the another structure of the MBMS dedicated carrier synchronizing apparatus according to the present invention includes a MBMS dedicated carrier detecting unit 1010 and a MBMS dedicated carrier frame synchronizing unit 1011, wherein, the MBMS dedicated carrier monitoring unit 1010 is used to monitor the MBMS dedicated carrier according to the MBMS dedicated carrier frequency carried by the user equipment itself.

The MBMS dedicated carrier frame synchronizing unit 1011 is used to select a time window with a length of the sum of half of the preamble length and a sub-frame length on the MBMS dedicated carrier, correlate the selected time window with the preamble of the service time slot of the MBMS dedicated carrier carried by the user equipment, then determine the position of the control time slot and realize frame synchronization of the MBMS dedicated carrier.

The MBMS dedicated carrier synchronizing apparatus shown in FIG. 10 has the same structure with the MBMS dedicated carrier synchronizing unit 10 shown in FIG. 7, and then is omitted here.

Figure 11:
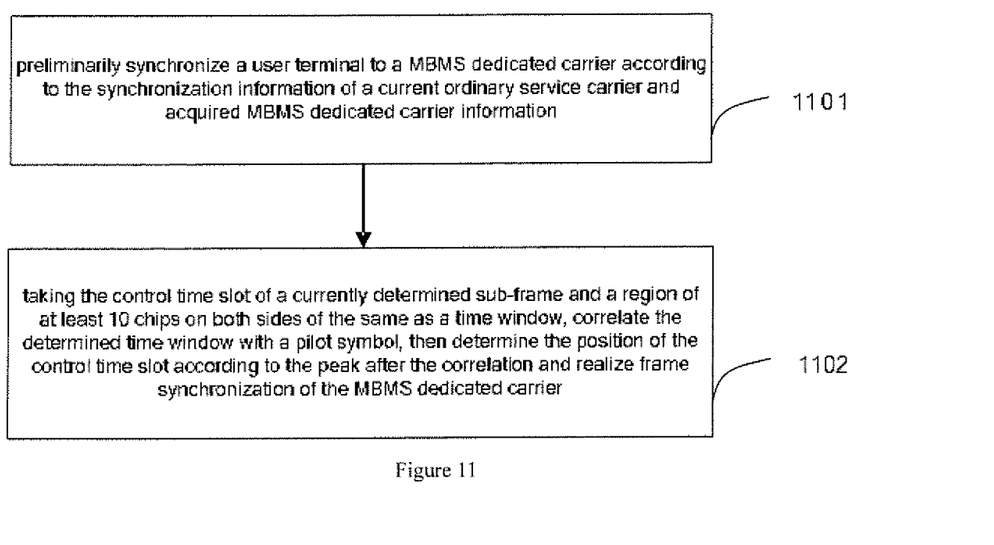
FIG. 11 is a flowchart of a MBMS dedicated carrier synchronizing method according to the present invention.

FIG. 11 is a flowchart of a MBMS dedicated carrier synchronizing method according to the present invention, and as shown in FIG. 11, the MBMS dedicated carrier synchronizing method according to the present invention includes:

Step 1101, preliminarily synchronize a user equipment to a MBMS dedicated carrier according to the synchronization information of a current ordinary service carrier and the acquired MBMS dedicated carrier information; and Step 1102, taking the control time slot of a currently determined sub-frame and a region of at least 10 chips on both sides of the same as a time window, correlate the determined time window with a pilot signal, then determine the position of the control time slot according to the peak after the correlation and realize frame synchronization of the MBMS dedicated carrier.

The MBMS dedicated carrier information includes, but not limited to, a MBMS dedicated carrier frequency and the preamble of the control time slot in a MBMS dedicated carrier frame. In step 1101, preliminary synchronization refers to preliminarily synchronizing a user equipment to a MBMS dedicated carrier according to the synchronization information of a current ordinary service carrier and the frequency information of the MBMS dedicated carrier. The pilot signal in step 1102 is the preamble of the control time slot in the MBMS dedicated carrier frame.

The method for synchronizing to a MBMS dedicated carrier shown in FIG. 11 is for a handset user equipment, which can be referred to the relevant description to FIG. 6.

Figure 12:
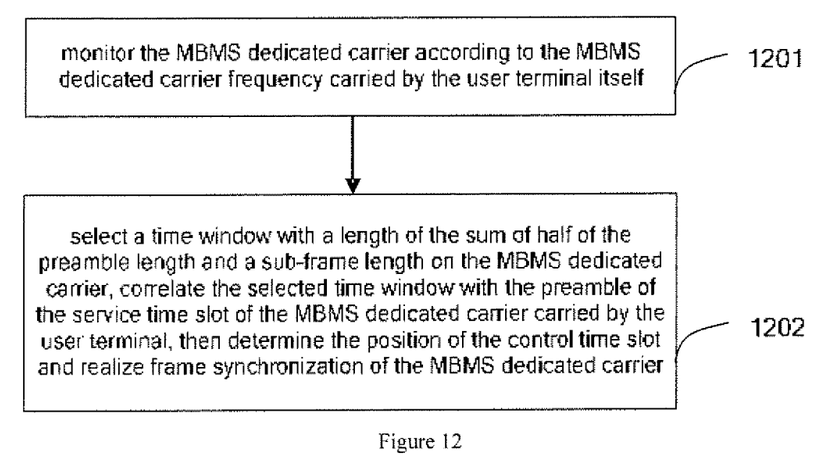
FIG. 12 is a flowchart of another MBMS dedicated carrier synchronizing method according to the present invention.

FIG. 12 is a flowchart of another MBMS dedicated carrier synchronizing method according to the present invention, and as shown in FIG. 12, another MBMS dedicated carrier synchronizing method according to the present invention includes:

Step 1201, monitor the MBMS dedicated carrier according to the MBMS dedicated carrier frequency carried by the user equipment itself; and Step 1202, select a time window with a length of the sum of half of the preamble length and a sub-frame length on the MBMS dedicated carrier, correlate the selected time window with the preamble of the service time slot of the MBMS dedicated carrier carried by the user equipment, then determine the position of the control time slot and realize frame synchronization of the MBMS dedicated carrier.

The method for synchronizing to a MBMS dedicated carrier shown in FIG. 12 is for a mobile television terminal, which can be referred to the relevant description to FIG. 7.

The above are just preferable embodiments of the present invention and shall not be construed as limitations on the scope of protection of the present invention.

What is claimed is:

1. An access method of Multimedia Broadcast Multicast Service (MBMS) on a dedicated carrier, comprising:
   synchronizing a user equipment to a Multimedia Broadcast Multicast Service (MBMS) dedicated carrier;
   the user equipment determining the start-frame of a system message on the MBMS dedicated carrier; and
   the user equipment monitoring the system message from the start-frame of the system message, wherein determining, by the user equipment, the start-frame of the system message includes:

A. continuously detecting the preamble of the control time slot of a sub-frame, determining a phase difference between the preambles of the control time slot and the service time slot in each sub-frame, and sequentially calculating difference values between the phase differences of the preambles of the control time slots and the service time slots of every two continuous sub-frames; and B. determining an start-frame for transmitting a system message according to the difference values between the phase differences of the preambles determined in step A.

2. The access method according to claim 1, wherein subsequent to step A, determining the start-frame of the system message includes:

if the difference values between the phase differences of the preambles of the control time slots and the service time slots of every two continuous sub-frames are not equal to each other, judging whether the difference between the difference values is within a set range, and determining the start-frame for transmitting a system message according to the difference values if it is within the set range.

3. The access method according to claim 2, wherein the service time slot in step A is time slot TS1.

4. The access method according to claim 1, wherein determining the start-frame of the system message includes:

continuously detecting the preamble of the control time slot in the sub-frame, finding out the sub-frame in which the codeword of the preamble of the control time slot changes, and determining the start-frame for transmitting the system message according to the agreed number of the sub-frames in which the codeword changes.

5. The access method according to claim 1, wherein synchronizing a user equipment to a MBMS dedicated carrier includes:

preliminarily synchronizing a user equipment to a MBMS dedicated carrier according to the synchronization information of a current ordinary service carrier and the acquired MBMS dedicated carrier information; and taking the control time slot of a currently determined sub-frame and a region of at least 10 chips on both sides of the same as a time window, correlating the determined time window with a pilot signal, then determining the position of the control time slot according to the peak after the correlation and realizing frame synchronization of the MBMS dedicated carrier.

6. The access method according to claim 5, wherein the MBMS dedicated carrier information includes: a MBMS dedicated carrier frequency and the preamble of the control time slot in a MBMS dedicated carrier frame, and the pilot signal is the preamble of the control time slot in the MBMS dedicated carrier frame; and preliminarily synchronizing a user equipment to a MBMS dedicated carrier includes:

preliminarily synchronizing a user equipment to a MBMS dedicated carrier according to the synchronization information of a current ordinary service carrier and the frequency information of the MBMS dedicated carrier.

7. The access method according to claim 1, wherein synchronizing the user equipment to the MBMS dedicated carrier includes:

monitoring the MBMS dedicated carrier according to the MBMS dedicated carrier frequency carried by the user equipment itself; and selecting a time window with a length of at least the sum of half of the preamble length and a sub-frame length on the MBMS dedicated carrier, correlating the selected time window with the preamble of the service time slot of the MBMS dedicated carrier carried by the user equipment, then determining the position of the control time slot and realizing frame synchronization of the MBMS dedicated carrier.

* * * * *